UNITED STATES PATENT OFFICE.

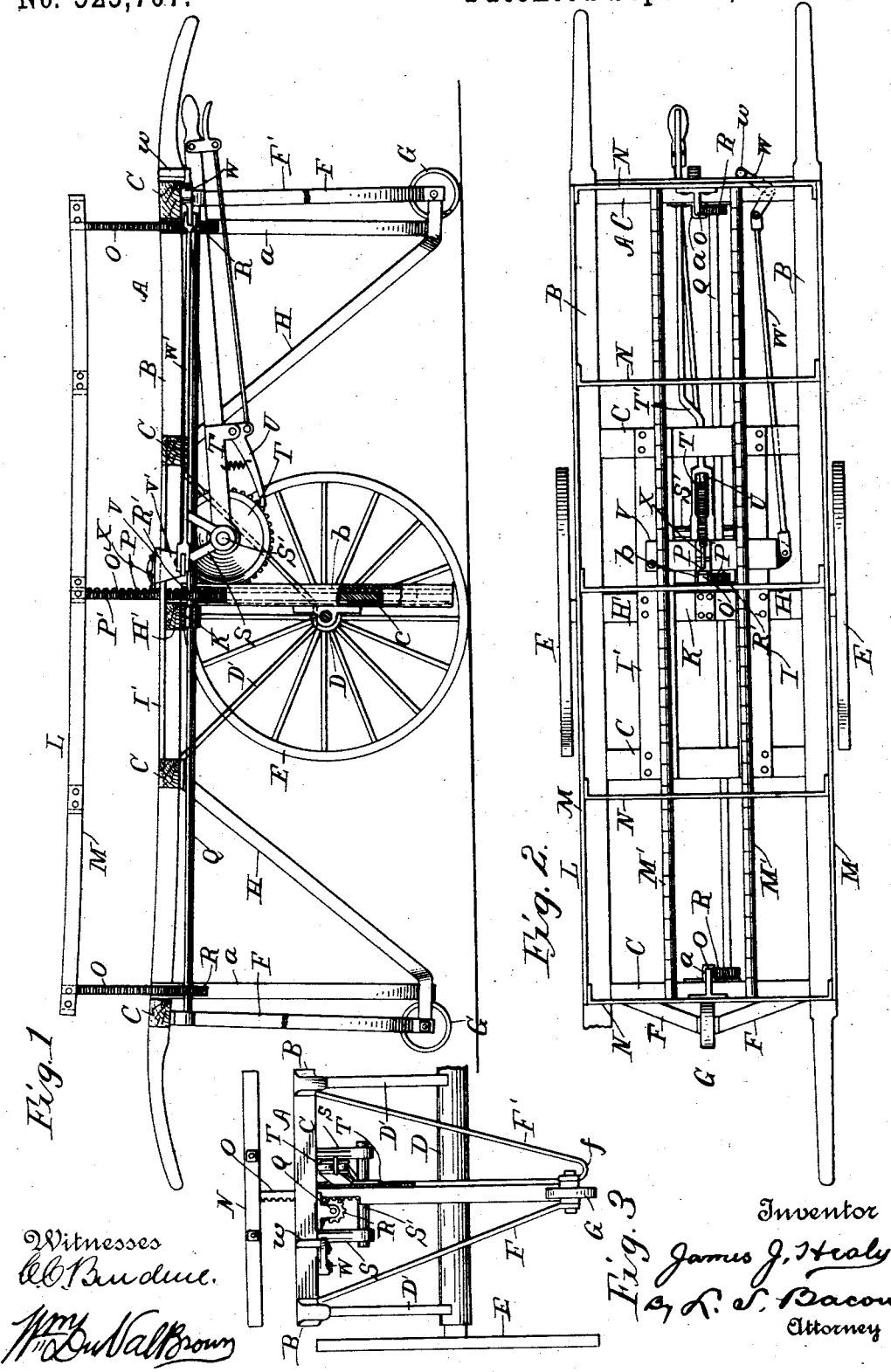

JAMES J. HEALY, OF CHICAGO, ILLINOIS.

HAND-TRUCK.

SPECIFICATION forming part of Letters Patent No. 525,707, dated September 11, 1894.

Application filed February 8, 1894. Serial No. 499,438. (No model.)

*To all whom it may concern:*

Be it known that I, JAMES J. HEALY, a citizen of the United States, residing at Chicago, in the county of Cook and State of Illinois, have invented certain new and useful Improvements in Trucks; and I do hereby declare the following to be a full, clear, and exact description of the invention, such as will enable others skilled in the art to which it appertains to make and use the same.

This invention relates to a new and useful improvement in "trucks" and it consists in the construction and arrangement of parts hereinafter described and definitely pointed out in the claims.

The aim and purpose of this invention is the provision in a truck of a movable platform which is adapted to be adjusted vertically to facilitate the moving or placing of trunks or other articles in places of various heights. These objects are attained by the construction illustrated in the accompanying drawings wherein like letters of reference indicate corresponding parts in the several views, and in which—

Figure 1 is an elevation showing the near wheel and longitudinal sill removed, parts being broken away. Fig. 2 is a top plan view, and Fig. 3 is a detail front elevation of the forward part of the device.

In the drawings A represents the frame having the longitudinal parallel sills B and the cross sills C C', the sills B having their ends shaped to form handles. The frame A is supported on the axle D by the V-shaped brace D'. On the axle are journaled the main supporting wheels E.

The opposite ends of the frame are supported by the braces F and F' to the lower end of which are journaled the caster wheels G. The wheels G are mounted in plane above the lowermost periphery of the wheels E to allow a slight rocking movement of the frame. The brace F' is formed with a curve *f* at its lower end leaving an open space between its sides and its bearing wheel, for purposes hereinafter described.

H are inclined brace rods connecting the lower ends of the braces F and F' to the cross bars C'.

H' are blocks extending from the center and at right angles to the longitudinal sills B. On the cross bars C' and blocks H' are secured the longitudinal strips I and I'.

K is a cross strip secured to the under side of the sills B and blocks H'.

L is the movable platform having the outer longitudinal sills M and the inner sills M'.

N are cross braces connecting the sills.

The inner sills M' have a series of small rollers loosely journaled thereon, forming rotary bearing surfaces for the articles placed on the platform.

Extending downward from the opposite ends of the platform L are the rack bars O, and from the center of the platform the rack bar O' extends downward having a series of teeth P and P' on two of its sides.

Q is a shaft having its opposite ends journaled to the cross bars C of the frame A and passing through a bearing formed on the under side of the cross strip K. On the ends of the shaft Q are rigidly secured pinions R meshing with the rack bars O.

R' is a pinion secured centrally on the shaft meshing with the teeth P' on the rack bar O'.

Extending from the under side of the longitudinal strips I I' are the brackets S in which is journaled the shaft S' having the pinion T rigidly secured thereon and meshing with the teeth P on the rack bar O'. Extending rearwardly and loosely journaled on the shaft S' is the actuating lever T'. This lever extends beyond the rear of the frame A and is permitted a long sweep by means of the curvature in the brace F', and has a spring pawl U having its free end engaging the teeth of the pinion T. This pawl U has an actuating rod extending to the end of the lever T', the pawl U and its actuating rod being of the usual well known construction.

Pivotally secured to the strip I' is a plate V extending across the rear face of the rack bar O' and over the strip I, and is then bent downward forming a shoulder V' which forms a stop for the plate when the plate is moved backward.

W is a bell crank lever secured to the rear cross sill C having a handle *w* and is connected to the free end of the plate V by the rod W'.

Secured on the plate V is a spring pawl X arranged to engage the teeth P on the rack bar O' when the plate is moved forward.

The rack bars O are protected by suitable casings a secured to the frame A having cut away portions to allow the meshing of the rack bars and pinions R. The rack bar O' is also protected by the casing b having its upper end secured to the cross strip K and its lower portion secured to the axle and having suitable open portions to allow the meshing of the pinions with the teeth of the bar. The end of the rack bar has an enlargement or block c secured to its lower end, of a size to fit snugly in the casing b to insure the perfect meshing of its teeth and the pinions and to add to the stability of the platform when in a raised position.

The operation of the device is as follows:—The article to be moved is placed on the truck and when it is desired to raise the article the operator takes hold of the handle of the lever T' and working it up and down revolves the pinion T which engages the teeth P on the rack bar O' and raises the rack bar and the platform, at the same time the teeth P' of the rack bar O' engage the pinion R' on the shaft Q revolving said shaft and pinions R which engage the teeth of the rack bars O raising the ends of the platform. It will thus be seen that the platform is raised at both ends and at the center simultaneously, thereby avoiding any undue strain at any point. At the same time the pawl X on the plate V engages the teeth P of the rack bar O' and prevents the platform from descending. When it is desired to lower the platform the operator disengages the pawl U from the pinion T and leaving the pinion free to revolve, and disengages the pawl X from the rack bar O' when the platform will descend by its own weight or the weight of the articles placed thereon.

It will be noticed that by extending the actuating lever T' and the shaft W' back to the rear of the frame the operator either after pushing or pulling the truck can raise the platform by means of the lever T' and lock it in its raised position or unlock it to allow it to fall of its own weight, without moving from his position.

I am aware that many minor changes can be made in the construction and arrangement of the parts without in the least departing from the nature and principle of my invention.

Having thus described the invention, what I claim as new, and desire to secure by Letters Patent, is—

1. In a truck, the combination with the frame, of a movable platform on the frame, rack bars extending from the ends and center of said platform, a longitudinal shaft journaled on the frame, pinions on the shaft meshing with the rack bars and means for actuating the shaft, substantially as described.

2. In a truck, the combination with the frame, of a movable platform on the frame, rack bars extending from the opposite ends of the platform, a rack bar extending from the center of said platform having a series of teeth on two of its faces, a longitudinal shaft journaled on the frame having pinions on its opposite ends meshing with the rack bars on the ends of the platform, a pinion on the shaft meshing with one series of teeth on the central rack bar, a pinion on the frame meshing with the other series of teeth on said central rack bar, an actuating lever for said pinion extending to the rear of the frame and means for locking the platform in its adjusted position, substantially as described.

3. In a truck, the combination with the frame, of a movable platform on the frame, rack bars extending from said platform, a shaft on the frame, pinions on the shaft meshing with said rack bars, a pinion on the frame meshing with one of said rack bars, an actuating lever for said pinion extending to the rear of the frame, and independent means for locking the platform in its adjusted position, substantially as described.

4. In a truck, the combination with the frame, of a movable platform on the frame, rack bars extending from the opposite ends of the platform, a rack bar extending centrally from said platform, pinions on the frame engaging said rack bars, means for actuating the pinions, a plate pivoted on the frame, an actuating rod pivoted to the front end of the plate extending to the rear of the frame for adjusting the plate longitudinally, and a spring pawl on said plate engaging the teeth of the central rack bar, substantially as described.

5. In a truck, the combination with the frame, of a movable platform on the frame, rack bars extending from said platform, a shaft journaled on the frame having pinions meshing with the rack bars, an actuating pinion for the rack bars, an actuating lever for said pinion extending to the rear of the frame, means for locking the platform in its adjusted position, and an actuating rod for said means extending to the rear of the frame and adjacent to the actuating lever for the pinion, substantially as described.

In testimony whereof I affix my signature in presence of two witnesses.

JAMES J. HEALY.

Witnesses:
L. B. LANGWORTHY,
EDW. J. D. AHMS.